(12) United States Patent
Pinto

(10) Patent No.: US 7,386,919 B2
(45) Date of Patent: Jun. 17, 2008

(54) TEXTILE RECYCLING APPARATUS

(76) Inventor: Akiva Pinto, Narids Str. 9 A, Jerusalem 92461 (IL)

( * ) Notice: Subject to any disclaimer, the term of this patent is extended or adjusted under 35 U.S.C. 154(b) by 80 days.

(21) Appl. No.: 11/602,050

(22) Filed: Nov. 20, 2006

(65) Prior Publication Data

US 2008/0115330 A1    May 22, 2008

(51) Int. Cl.
  *D01G 37/00*   (2006.01)
(52) U.S. Cl. ................. 19/0.3; 241/261.2; 241/297
(58) Field of Classification Search ............ 19/0.3; 241/261.2, 261.3, 297
See application file for complete search history.

(56) References Cited

U.S. PATENT DOCUMENTS

| 3,049,307 | A | * | 8/1962 | Dalzell, Jr. ............. 241/261.3 |
| 5,011,091 | A | | 4/1991 | Kopecky |
| 5,343,597 | A | * | 9/1994 | Pinto et al. ................. 19/205 |
| 5,491,186 | A | | 2/1996 | Kean et al. |
| 5,890,665 | A | | 4/1999 | Arasmith |
| 6,021,549 | A | | 2/2000 | Stummer |
| 6,061,876 | A | | 5/2000 | Rowe |
| 6,360,403 | B1 | | 3/2002 | Rubenach |
| 6,557,214 | B2 | | 5/2003 | Pinto |
| 7,075,018 | B1 | | 7/2006 | Scholz et al. |
| 7,182,285 | B1 | * | 2/2007 | Stoltzfus et al. ......... 241/261.2 |
| RE39,688 | E | * | 6/2007 | LaRiviere ................ 241/46.01 |
| 2004/0028958 | A1 | | 2/2004 | Assink et al. |

FOREIGN PATENT DOCUMENTS

| DE | 19852033 | 5/2005 |
| GB | 998804 | 7/1965 |
| WO | WO 2006/013570 | 2/2006 |

* cited by examiner

*Primary Examiner*—Shaun R Hurley
(74) *Attorney, Agent, or Firm*—McNair Law Firm, P.A.

(57) ABSTRACT

Apparatus and method of recycling finished textile products into reusable fibers. The arrangement includes a confined chamber of diminishing width through which the textile product is moved. The chamber comprises a stationary side with rows of circumferentially arranged teeth separated by circumferentially arranged channels and a rotating side with radially arranged teeth separated by radially extending channels. The product is delivered to the channel where the teeth and the rotating action urge the product into and through the channel while progressively grinding and rendering it into fiber form.

15 Claims, 4 Drawing Sheets

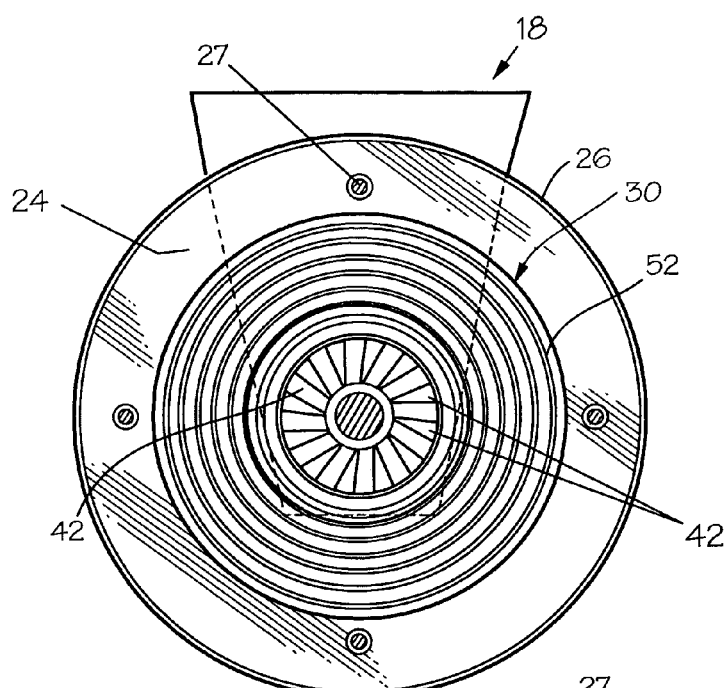
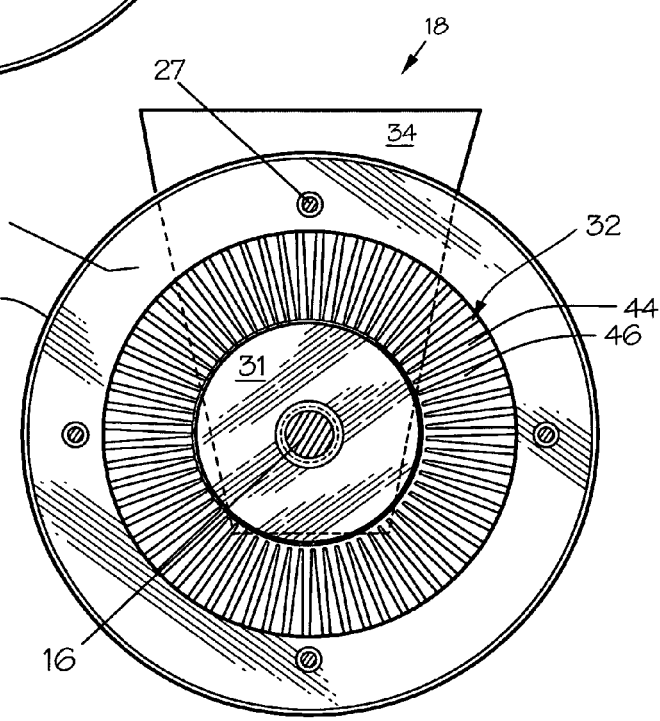

TEXTILE RECYCLING APPARATUS

BACKGROUND OF THE INVENTION

The instant invention is directed to apparatus and method of recycling finished and unfinished textile waste and scraps such as woven, knitted, tufted and compacted fabrics and converting them into fibers for use in the formation of new fabric.

These textile waste and scrap products may comprise overruns, products which fail to meet desired standards or simply waste during manufacture. Due to the cost of raw textile materials, it is desirable to reuse or recycle as much as possible discarded textile products.

Generally, recycled fibers are destined for use with lower end goods such as carpet backing, upholstery support fabrics which fabrics require uniformity in quality.

The current apparatus available to render textile fabric into fibers requires the use of multiple aligned rolls such as shown in U.S. Pat. No. 6,061,876. These devices are expensive, due to the cost of the rolls. They are also slow because of the multiple rolls or moving parts. Another drawback of the current devices is an inability to reconstitute short fibers, particularly from carpet pile yarns.

Accordingly, it is an object of the instant invention to provide an inexpensive yet durable device for rendering textile fabric into fibers of varying length but especially short fibers.

Another object of the invention is a device for rendering textile product into recycled fibers without the use of pin or toothed rolls.

Another object of the invention is to provide a device for rendering textile fabric into recycled fibers which operate with a minimum of moving parts.

Another object of the invention is the provision of an apparatus for rendering textile fabric formed of short fibers into fibers.

Accordingly, it is an object of the instant invention to provide a machine for converting textile fabric and other textile products through a shearing and compressive action into reusable fibers.

Another object of the invention is the provision of a fiber forming machine which is operative to generally uniformly blend the fiber forming materials during reduction to fiber form.

Another object of the invention is a fiber opening machine which acts to shred and blend textile articles during their reduction to fiber form.

SUMMARY OF THE INVENTION

The invention is directed to an apparatus for recycling finished and unfinished textile products and converting them into reusable fibers. The device includes a housing supporting a shaft rotating about a horizontal axis. A carrier is mounted for rotation with the shaft and the housing. The rotating carrier mounts a disk having a plurality of teeth on one side thereof. The teeth extend generally radially of the shaft with their outer face being generally along a common plane.

A stationary disk is mounted in the housing in spaced position from the shaft. The stationary disk includes a plurality of teeth on one side which are generally opposed the teeth of the rotating disk. The rotating disk and the stationary disk are arranged adjacent each other forming a channel gap or restricted channel of outwardly diminishing width.

A feed opening is formed about the shaft beneath the stationary disk and in alignment with a portion of the teeth on the rotating disk. A feed chamber connects with the feed opening and also with a collection chamber located outwardly of the rotating and stationary disk.

In operation, the textile product is fed through the feed opening into the feed chamber, is picked up by the teeth of the rotating disk moved into the restricted channel, cut, compressed and generally degraded. The degraded product is thrust outwardly and through the restricted channel. During movement through the restricted channel, the teeth of the stationary and rotating disk interact with the product progressively compressing, cutting and degrading it into fiber form. The fibers are expelled into said collection chamber.

A feed hopper is arranged vertically above the rotating disk. The feed hopper is adapted to receive the finished and unfinished textile products from a supply and to deliver them to the feed opening chamber of the feed.

A fan is mounted with the rotating shaft in the vicinity of the feed opening. The fan functions to provide an air flow through the feed chamber and assist in the delivery of the product.

The restricted channel is generally tapered with its widest point adjacent the rotating shaft and its narrowest point adjacent its outer periphery.

The rotating teeth which may be arranged parallel or in wedge-shaped relation are separated by generally parallel or wedge-shaped radial channels. The stationary teeth are radially arranged to extend about the rotating shaft. The rows of stationary teeth are also separated by parallel channels.

The channels vary between a width of about 3.15 mm at their inner ends and about 5.4 mm at their outer ends or they may be of equal width along their length.

The housing may mount the stationary disk for adjustment axially of the shaft. This adjustment varies the width of the restricted channel.

The collection chamber is arranged outwardly of the stationary and rotating disk. A collection plenum connects with the lower side of the collection chamber and provides for the removal of the degraded product and formed fiber. Air circulating means, which draws air from the collection chamber and through the collection plenum, cooperate with the feed fan to provide air movement through the recycling apparatus.

DESCRIPTION OF THE DRAWINGS

FIG. 2 is a cutaway view along lines 2-2 of FIG. 1 showing the stationary disk with circumferential grooves.

FIG. 3 is a cutaway view along lines 3-3 of FIG. 1 showing the rotating disk with radial grooves.

Referring now in more detail to the drawings, the invention will now be described in more detail.

DESCRIPTION OF A PREFERRED EMBODIMENT

A textile recycling apparatus is shown generally at 10. The device is adapted to receive new or used finished textiles such as fabric pieces which may be any of woven, knitted, tufted or in fiber batt form and converting these fabric pieces into reusable fibers. The device is particularly adapted to render through a shearing compressive action new or used carpet pile yarn into fiber. This is particularly difficult due to the tight twist and short yarn parts forming these type yarns. The recycling apparatus includes a support frame 12 which mounts on its upper surface a pair of bearings 14 which support rotating shaft 16 and housing 18.

Figure 1:
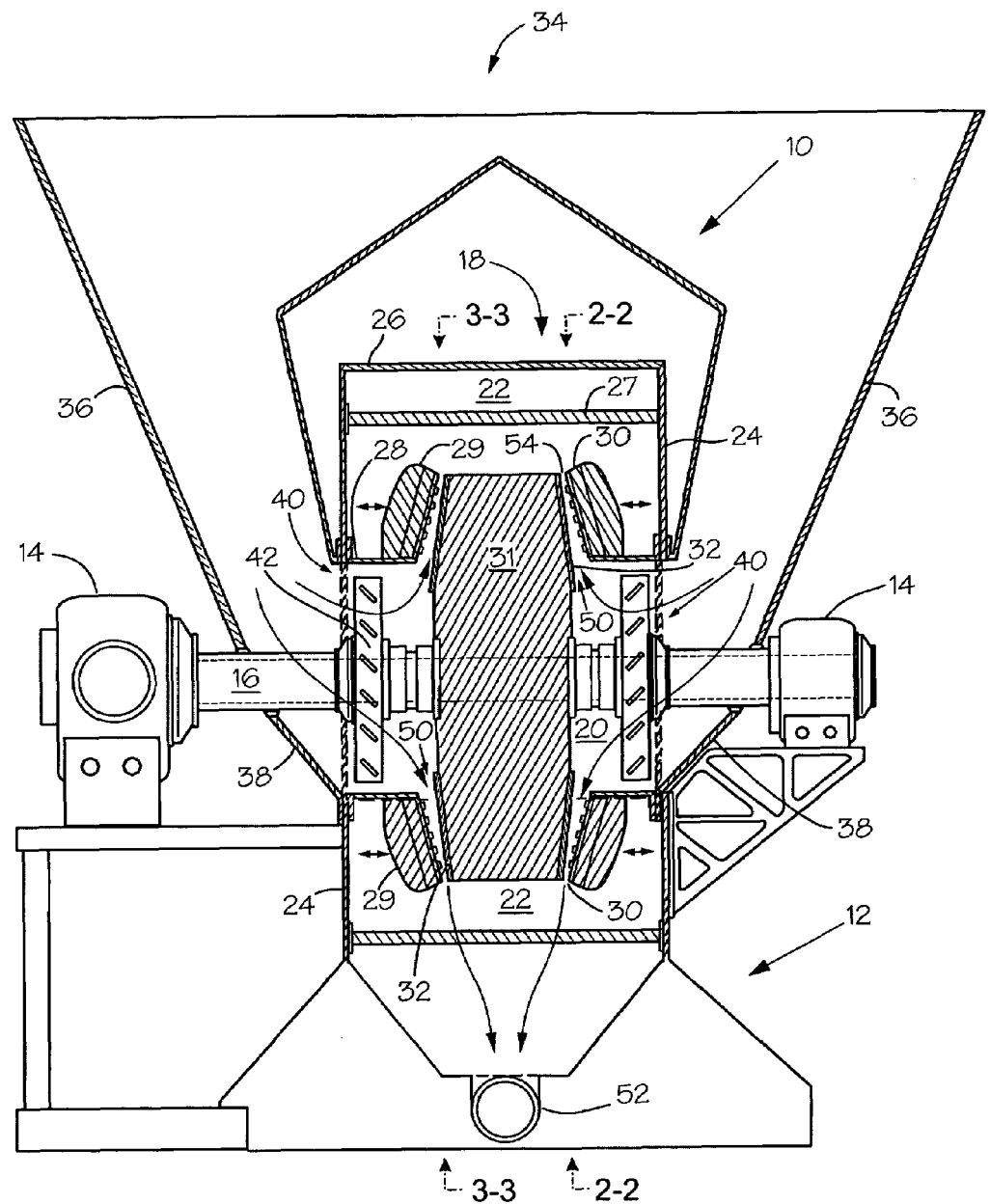
FIG. 1 is a sectional side view of the fabric reduction machine of the invention.

Housing 18 is formed about rotating shaft 16 and includes a feed chamber 20 and a collection chamber 22. Housing 18 includes opposed and spaced vertical walls 24, inter-connected with an outer peripheral wall 26. Rods 27 connect housing 18 with support frame 12 in any desired manner one such being taught in U.S. Pat. No. 5,011,091. Inner peripheral wall sections 28 are arranged inwardly of wall 26 and are supported at their outer edges at an intermediate area of side walls 24. Inner edges of wall sections 28 carry mounting members 29 which support stationary disk members 30 in spaced and generally inwardly directed radial positions. See FIG. 1. Outwardly of wall sections 28 and between the side and peripheral walls 24, 26 is a collection chamber 22. Inwardly of wall sections 28, between side walls 24 is formed feed chamber 20. It is noted that peripheral walls 26, 28 mounting members 29, disk members 30 and vertical walls 24 all extend circumferentially about shaft 16.

Mounted for rotation with rotating shaft 16 is rotating carrier 31 which mount disk 32. The carrier mounts the disks radially from the shaft with their radial extensions generally aligned with those of stationary disks 30 and its inner radial extension being inwardly of the inner radial extension of stationary disk 30 and extending into feed chamber 20.

Outwardly and above housing 18 is formed feed hopper 34 which is supported in a position slightly above rotating shaft 16. Hopper 34 includes vertical walls 36 located outwardly of housing walls 24 and which terminate with inwardly directed extensions 38. The ends of extensions 38 are connected with vertical walls 24. The upper end of feed hopper 34 is generally open. There may be provided a delivery or supply belt of the type disclosed in any of U.S. Pat. No. 6,061,876, 6,360,403 or 7,075,018 which acts to carry the textile product for deposit into feed hopper 34. The feed belt delivery system may include an opening apparatus or it may simply feed the material directly into the hopper.

A feed opening 40, which opens into feed chamber 20, is formed about rotating shaft 16 on either side of carrier 31 supporting rotating disk 32. A fan 42 may be secured to rotating shaft 16 adjacent feed opening 40 to assist in movement of the product into the feed chamber and to provide a positive air current through the feed chamber and the collection chamber as indicated by the arrows.

Figure 5:
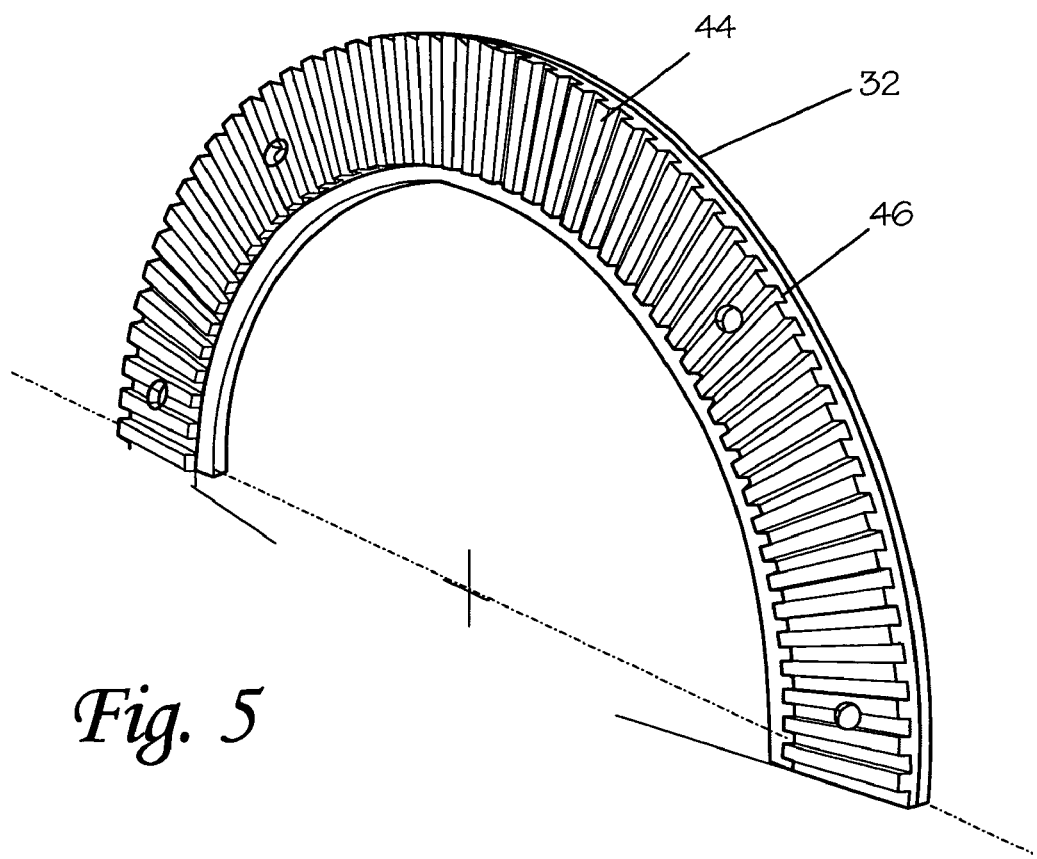
FIG. 5 is a side sectional perspective view of the plate with radial teeth.

Rotating disks 32 have arranged about their outer surface radially extending teeth 44 as best seen in FIGS. 3 and 5. Each tooth may be generally wedge-shaped having a width of about 5.4 mm at its outer end and a width of about 3.15 mm at its inner end. There is a channel 46 formed between each of the teeth which is about 5.4 mm wide, adjacent its outer end. Channel 46 may be slightly smaller at its inner end, i.e. about 3.15 mm. Each tooth is about 3" in length while disk 30 is about 18" in diameter. The outer surface of each tooth is generally planar. Rotating disks 32 when positioned on each side of carrier 31 are generally inclined toward each other along an angle of between 4° and 6° of vertical or of 90°.

Figure 6:
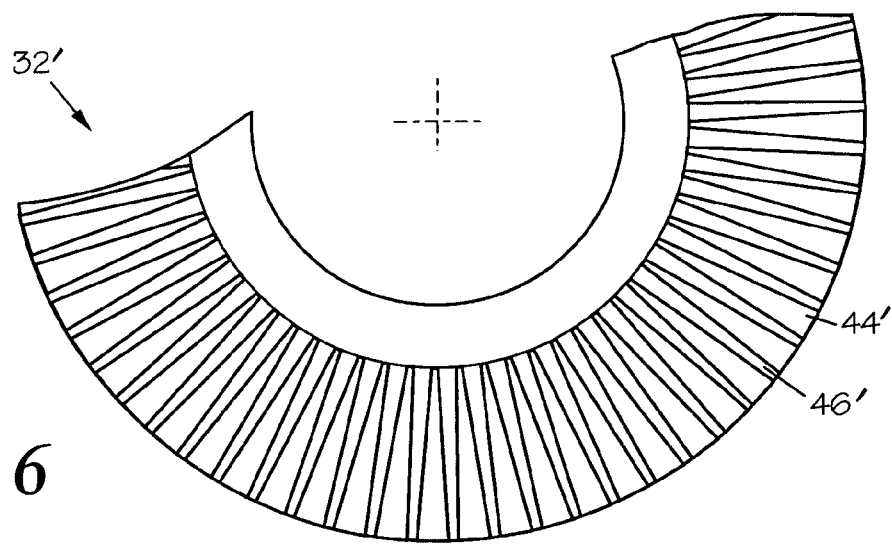
FIG. 6 is a side sectional view of another arrangement of teeth.

Another tooth arrangement forming rotating disk is shown in FIG. 6 at $32^1$. In this arrangement, teeth $44^1$ are wedge-shaped with their inner ends being about 3 mm in width and their outer ends being about 16.5 mm. In this arrangement, channels $46^1$ have an inner width of about 10 mm and an outer width of about 5.5 mm.

Figure 7:
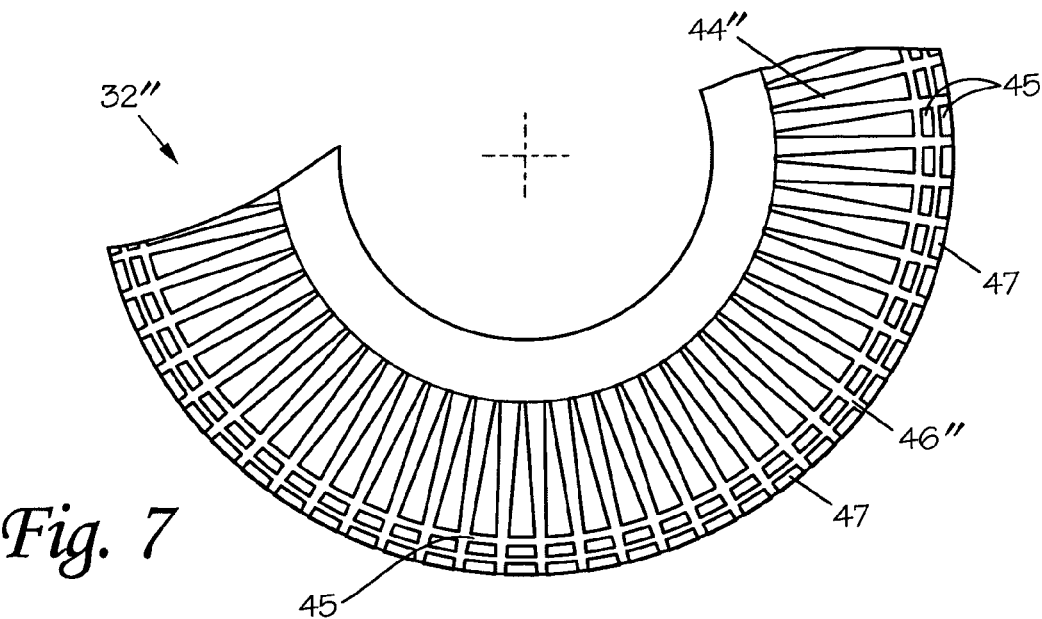
FIG. 7 is a side sectional view of another arrangement of teeth.

A third arrangement for the construction of the teeth of a rotating disk is shown at $32^{11}$ in FIG. 7. In this arrangement, channels $46^{11}$ and teeth $44^{11}$ are substantially as described in the arrangement shown in FIG. 6 as concerns their size. The primary difference concerns the outer sections of teeth $44^{11}$ which form a plurality of circumferential channels 45 cut therethrough. The circumferential channels 45 are about 5.5 mm in width. Teeth $44^{11}$ at their outer ends are formed as individual tooth elements 47. Channels $46^{11}$, as well as teeth $44^{11}$, to include elements 47 are sized generally as set forth for the arrangement shown in FIG. 6.

The outer or tooth and channel bearing surfaces of disk 30 and 32 may each, separately or individually, have a roughened finish such as a sand finish for use with selected type products.

The facing surfaces of all teeth are generally planar forming an even and gradually decreasing space between the opposed stationary and rotating teeth as earlier stated. The particular set of stationary teeth selected for use depends upon the type material being rendered into fibers and the length of the fibers being formed.

Figure 4:
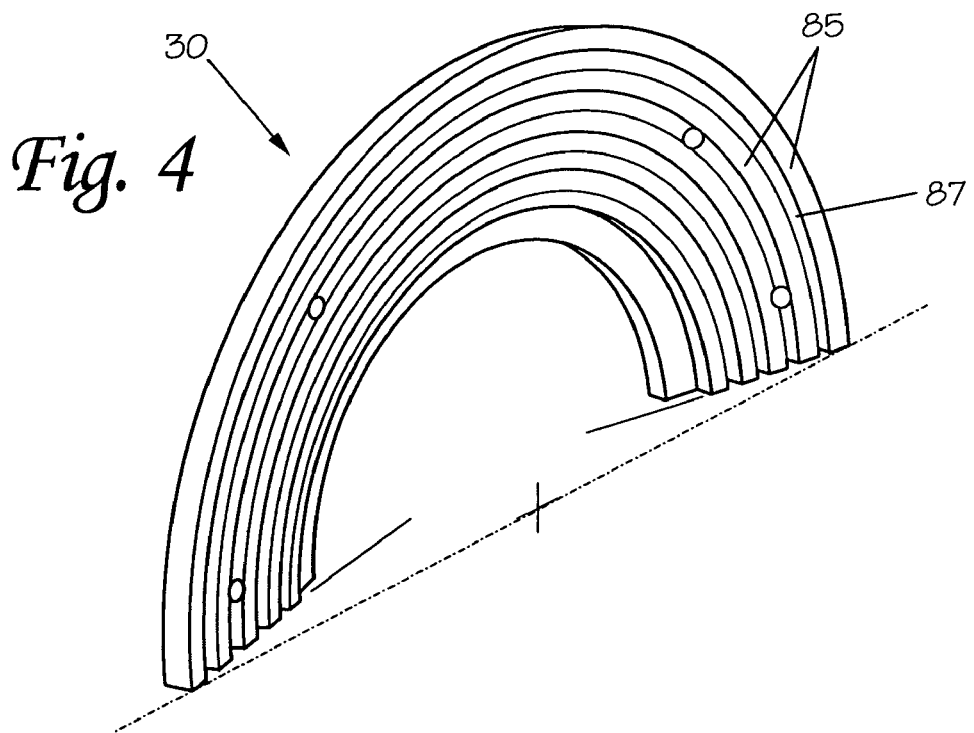
FIG. 4 is a side sectional perspective view of the plate with circumferential teeth.

Stationary disks 30, as shown in FIGS. 2 and 4, are structured to have opposing faces positioned to be generally tapered inwardly toward each other along an angle which is slightly less, i.e., between 1 and 30, than the angle along which rotating disks 32 are arranged. The outwardly directed faces of stationary disk 30 carry radially spaced teeth 85 constructed generally as the earlier described teeth of rotating disk 32. Teeth 85 are arranged in arcuate or circumferential paths which are parallel with the circumference of rotating shaft 14. Each tooth is sized and includes a generally planar outer surface having a width of between 5.5 and 16.5 mm. There are arcuate channels 87 formed between each of teeth 85 which are generally about 3.4-5.4 mm in width and are generally equal size throughout.

Rotating disk 32 and stationary disk 30 create a restricted tapered shearing and compressing or disintegrating channel 50 which generally is formed circumferentially about shaft 16. Disintegrating channel 50 has a width of between 1.3-1.7 mm at its lower or entry end from which it gradually tapers inwardly to a width of between 0.1-0.5 mm at its upper end or exit end 54. Because of the planar outer surfaces of teeth 44 and 85, the adjustment between the rotating teeth and the stationary teeth can be made to form a very tight clearance at the exit end of the channel. The position of disk 30 and 32 relative to each other or the size of channel 50 is adjustable by any desirable arrangement, one such being taught in U.S. Pat. No. 5,011,091.

Due to the fact that the textile material being fed from hopper 36 through openings 40 and into feed chamber 20 may include pieces of substantial bulk, i.e. cut pieces in the range of 1×1", it is necessary that the entry be of considerable width. As the product is drawn into channel 50, it is forced outward by centrifugal force created by rotating disk 32 as well as by air current created by fan 42 and an exhaust fan associated with the collection plenum 52. Because channels 46 and 87 separating the teeth of the stationary and rotating disk are arranged in opposed directions, smaller product pieces cannot become wedged in the channels but continue to be engaged by the teeth to be ground into fiber form. As the goods enter the channel, the teeth engage, compress, cut and grind the material in an increasing manner, due to the merging shape of the channel, reducing the product to fibers as it reaches the exit of channel 50.

Collection chamber 22 receives the fibers exiting channel 50 at end 54 generally circumferentially of shaft 16. Once the fibers reach collection chamber 22, they are drawn or fall to its lower surface where they are then drawn into collection plenum 52 which moves them away from the recycling apparatus for further processing.

In operation, textile products in the form of fabric pieces, which may include carpet pieces, are delivered to feed hopper 34 at a controlled rate. The product passes downwardly through the hopper to be fed evenly through feed openings 40 and into feed chamber 20. The material is urged outwardly from the feed chamber into disintegrating channel 50 and between rotating and stationary teeth 44, 85 where disintegration into fiber form begins and continues at an increasing pace as the goods are moved radially outward through channel 50. The material has been reduced to fibers when it exits through exit end 54 and into collection chamber 22.

Gravity, along with an outwardly directed air current moving through the collection plenum first moves the fibers into the collection plenum and then removes the fibers for further processing.

Because of the minimum member of moving parts, i.e. rotating disk 32, it is possible to drive rotating shaft 16 at very high speeds, i.e. between 5000 and 7000 rpm without causing unnecessary downtime. The ability to operate at very high rpm's provides for greater production. Limited moving parts provide for reduced maintenance.

It is noted that heavy particles such as coating material will fall to the bottom of collection chamber 22 where they may be removed as trash.

While a preferred embodiment of the invention has been described using specific terms, such description is for illustrative purposes only, and it is to be understood that changes and variations may be made without departing from the spirit or scope of the following claims.

What is claimed is:

1. An apparatus for recycling finished and unfinished textile products into reusable fibers comprising:
   a housing;
   a shaft rotating about an axis carried by said housing;
   a carrier mounted for rotation with said shaft within said housing;
   said rotating carrier having a plurality of teeth on at least one side thereof, said teeth of said rotating carrier extending radially of said shaft;
   a stationary disk mounted in said housing in spaced position from said shaft, said stationary disk having a plurality of teeth on one side thereof, said teeth of said stationary disk extending circumferentially of said shaft;
   said one side of said rotating carrier and said stationary disk being arranged adjacent each other forming a restricted channel of diminishing width;
   a feed opening formed about said shaft, beneath said stationary disk; and
   a collection chamber located outwardly of said restricted channel; wherein,
   said textile product fed through said feed opening is picked up by said teeth carried by said rotating carrier and urged outwardly into said restricted channel where said teeth of said stationary disk and rotating carrier interact with said product reducing it to opened fibers, said product of opened fibers being expelled out of said restricted channel into said collection chamber.

2. The recycling apparatus of claim 1 wherein said rotating carrier includes a pair of sides, each said side of said pair of sides mounting a disk carrying said teeth.

3. The recycling apparatus of claim 2 wherein said stationary disk comprises a pair of stationary disks each with a plurality of said teeth on one side, each said stationary disk of said pair of stationary disks being mounted in opposed relation with said teeth of said rotating disk.

4. The recycling apparatus of claim 3 wherein said teeth of said rotating and stationary disk have a rough finish.

5. The recycling apparatus of claim 1 including a feed chamber spaced from said rotating carrier, said feed chamber being adapted to receive said finished and unfinished textile products from a supply and to deliver them into said feed opening.

6. The recycling apparatus of claim 1 including a fan mounted with said rotating shaft in the vicinity of said feed opening.

7. The recycling apparatus of claim 1 wherein said restricted channel is generally tapered from about 1.5 mm adjacent said feed opening to about 0.3 mm adjacent its exit opening.

8. The recycling apparatus of claim 7 wherein there are a pair of said restricted channels.

9. The recycling apparatus of claim 1 wherein said rotating teeth are separated by radial channels.

10. The recycling apparatus of claim 1 wherein said stationary teeth are separated by generally circumferentially shaped channels.

11. The recycling apparatus of claim 1 wherein said housing mounts said stationary disk for adjustment axially of said shaft.

12. The recycling apparatus of claim 1 wherein said collection chamber is arranged about said stationary and rotating teeth.

13. The recycling apparatus of claim 1 including air circulating means forcing air into said feed opening and drawing air from said collection chamber providing an air current through said recycling apparatus.

14. A method of recycling finished textile product to fiber form including:
   providing a radial restricted chamber having an entry end and an exit end, said chamber having a first side comprised of stationary circumferentially arranged teeth and a second side comprised of radially arranged rotating teeth;
   feeding said finished textile product into said entry end of said restricted channel, rotating said rotating teeth causing said stationary and rotating teeth to engage with said product forcing it through said channel while compressing, grinding and cutting the product into fiber form; and
   causing said product of fiber form to pass through said exit end.

15. An apparatus for recycling finished and unfinished textile products into reusable fibers comprising:
   a housing;
   a shaft rotating about an axis carried by said housing;
   a carrier mounted for rotation with said shaft within said housing;

said rotating carrier having a first plurality of teeth arranged over at least one side thereof and about said shaft;

a stationary disk mounted in said housing in spaced position from said shaft, said stationary disk having a second plurality of teeth arranged over one side thereof;

one of said first and second plurality of teeth being arranged in spaced circumferential rows separated by circumferential channels and one of said first and second plurality of teeth being arranged in spaced radial rows separated by radial channels;

said first and second plurality of teeth being arranged in adjacent opposed positions forming a restricted channel of diminishing width;

a feed opening formed about said shaft, beneath said stationary disk and aligned with a portion of said teeth on said rotating disk; and a collection chamber located outwardly of said rotating and stationary disk; wherein, said textile product fed through said feed opening is picked up by said teeth of said rotating disk and urged outwardly through said restricted channel where said teeth of said stationary and rotating disk interact with said product reducing it to fiber form, during its passage through said restricted channel and into said collection chamber.

* * * * *